United States Patent
Kitagawa

(10) Patent No.: US 7,315,039 B2
(45) Date of Patent: Jan. 1, 2008

(54) CONFOCAL MICROSPECTROSCOPE

(75) Inventor: Junichi Kitagawa, Musashino (JP)

(73) Assignee: Olympus Corporation, Tokyo (JP)

( * ) Notice: Subject to any disclaimer, the term of this patent is extended or adjusted under 35 U.S.C. 154(b) by 195 days.

(21) Appl. No.: 11/020,456

(22) Filed: Dec. 22, 2004

(65) Prior Publication Data

US 2005/0151094 A1    Jul. 14, 2005

(30) Foreign Application Priority Data

Jan. 8, 2004    (JP) .............................. 2004-002886

(51) Int. Cl.
*G01N 23/04*    (2006.01)
(52) U.S. Cl. .................................. 250/578.1
(58) Field of Classification Search ............. 250/578.1
See application file for complete search history.

(56) References Cited

U.S. PATENT DOCUMENTS

| | | | |
|---|---|---|---|
| 5,239,178 A * | 8/1993 | Derndinger et al. ........ 250/234 |
| 6,028,306 A * | 2/2000 | Hayashi ...................... 250/235 |
| 6,094,411 A * | 7/2000 | Matsuda et al. ............ 369/102 |
| 6,121,603 A * | 9/2000 | Hang et al. .................. 250/216 |
| 6,181,474 B1 * | 1/2001 | Ouderkirk et al. .......... 359/629 |
| 6,355,934 B1 * | 3/2002 | Osgood et al. ........... 250/458.1 |
| 6,423,956 B1 * | 7/2002 | Mandella et al. ......... 250/201.3 |
| 6,603,780 B2 * | 8/2003 | Miyai ........................... 372/23 |
| 6,985,224 B2 * | 1/2006 | Hart ............................ 356/317 |
| 6,987,259 B2 * | 1/2006 | Olszak et al. ............. 250/208.1 |
| 2002/0020819 A1 | 2/2002 | Wolleschensky et al. |
| 2003/0226977 A1 * | 12/2003 | Storz et al. ............... 250/458.1 |
| 2005/0024719 A1 * | 2/2005 | Nakata ........................ 359/368 |
| 2005/0053109 A1 * | 3/2005 | Hogan .......................... 372/50 |

FOREIGN PATENT DOCUMENTS

| | | |
|---|---|---|
| DE | 100 38 526 A1 | 2/2002 |
| WO | WO 02/12863 A1 | 2/2002 |

\* cited by examiner

*Primary Examiner*—David Porta
*Assistant Examiner*—Mark R Gaworecki
(74) *Attorney, Agent, or Firm*—Frishauf, Holtz, Goodman & Chick, P.C.

(57) ABSTRACT

There is disclosed a confocal microspectroscope comprising an excitation light source having two or more semiconductor light sources formed on the same chip by a semiconductor process and covering a predetermined wavelength region, a semiconductor light source control unit for controlling on/off of the semiconductor light sources, and a microscope main body having a scanning unit for scanning light from the excitation light source on a specimen and a confocal detector for detecting the light emitted from the specimen, wherein wavelengths of the light emitted from the two or more semiconductor light sources differ by a predetermined wavelength.

16 Claims, 2 Drawing Sheets

CONFOCAL MICROSPECTROSCOPE

CROSS-REFERENCE TO RELATED APPLICATIONS

This application is based upon and claims the benefit of priority from prior Japanese Patent Application No. 2004-002886, filed Jan. 8, 2004, the entire contents of which are incorporated herein by reference.

BACKGROUND OF THE INVENTION

1. Field of the Invention

The present invention relates to a confocal microspectroscope for use in a laser scanning microscope and the like.

2. Description of the Related Art

Laser scanning microscopes have been known which scan laser light from laser light sources to irradiate the light to samples and which detect light such as fluorescence and reflected light emitted from the samples.

Among the laser scanning microscopes, in recent years, as to confocal laser scanning microscopes (CLSM), enhancement of functions has advanced with development of fluorescent reagents. For example, as a method to detect the fluorescence from a specimen, in addition to a method in which the fluorescence in a desired wavelength region has heretofore been detected using a filter, a method has been put to practical use in which the fluorescence from the specimen is dispersed into fluorescent spectra using a diffraction grating and the like, and the fluorescent spectra are detected by a detection unit having a plurality of detection channels. According to this fluorescent spectral detecting method, the fluorescent spectrum inherent in each fluorescent reagent can be analyzed/quantized in detail.

U.S. Pat. Publication No. 2002/0020819 discloses the following fluorescent spectral detecting method. The fluorescent reagent for use in dyeing the specimen is excited by the laser light from the laser light source, and the fluorescence emitted from the excited fluorescent reagent is dispersed into the fluorescent spectra using the diffraction grating. Moreover, a spectral intensity of the fluorescent spectrum having each wavelength is detected by a multi-channel detection unit having a plurality of detection channels. In this case, in the laser light sources, a plurality of laser light sources which emit laser light having different wavelengths and high monochromaticity have been used, and the laser light sources have been used in accordance with an excitation wavelength of the fluorescent reagent.

BRIEF SUMMARY OF THE INVENTION

According to an aspect of the present invention, there is provided a confocal microspectroscope comprising an excitation light source having two or more semiconductor light sources formed on the same chip by a semiconductor process and covering a predetermined wavelength region, a semiconductor light source control unit for controlling on/off of the semiconductor light sources, and a microscope main body having a scanning unit for scanning light from the excitation light source on a specimen and a confocal detector for detecting the light emitted from the specimen, wherein wavelengths of the light emitted from the two or more semiconductor light sources differ by a predetermined wavelength.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and configure a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the drawings.

FIRST EMBODIMENT

Figure 1:
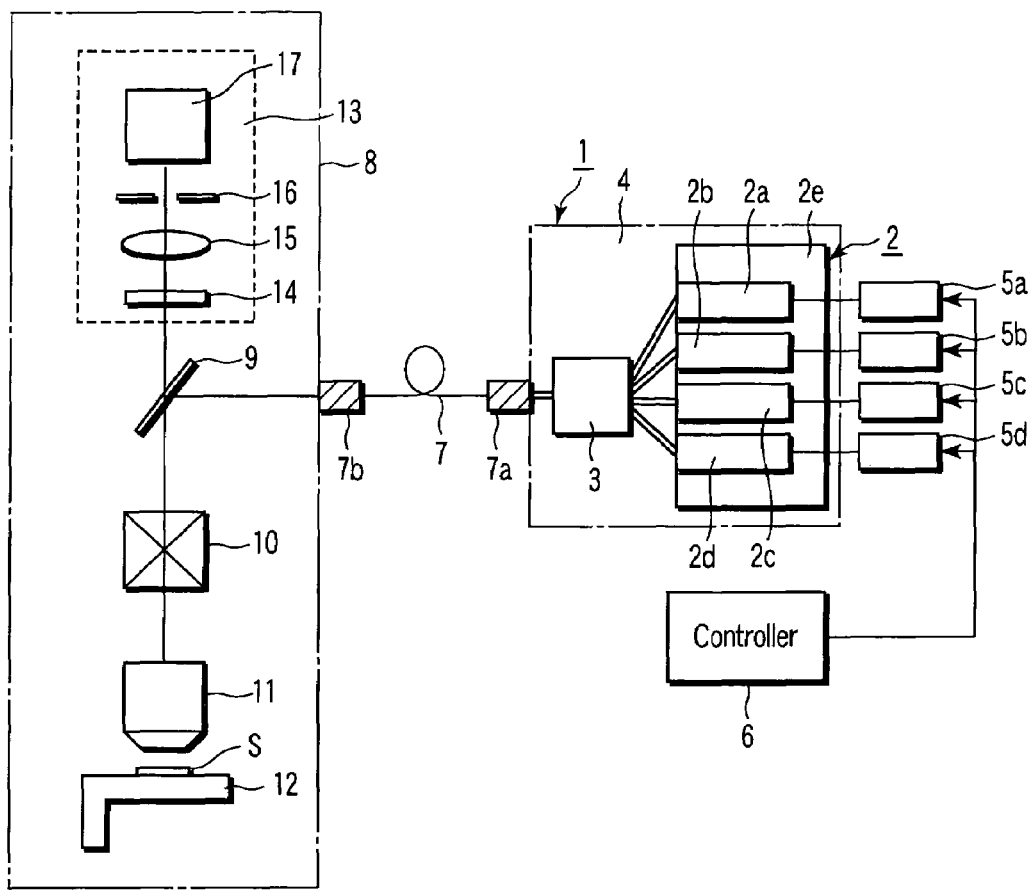
FIG. 1 is a diagram showing a schematic configuration of a first embodiment of the present invention.

FIG. 1 is a diagram showing a schematic configuration of a confocal microspectroscope irradiated to a confocal laser scanning microscope according to a first embodiment of the present invention.

In FIG. 1, a laser light source 1 comprises an excitation light source 2. The excitation light source 2 has laser diode (LD) light sources 2a to 2d to emit laser light whose wavelength slightly differs, served as semiconductor light sources. Distribution of composition components of LDs of the LD light sources 2a to 2d slightly differs. Accordingly, for example, monochromatic laser light having different wavelengths by a 5 nm step (430 nm, 435 nm, 440 nm, 445 nm) is emitted from the LD light sources 2a to 2d. The LD light sources 2a to 2d are formed into an array on the same chip 2e by a semiconductor process.

A coupler 3 is disposed on laser emitted light paths of the LD light sources 2a to 2d. The coupler 3 combines the laser light emitted from the LD light sources 2a to 2d to output one beam.

The excitation light source 2 and the coupler 3 are disposed on the same substrate 4, and formed into a unit which is the laser light source 1.

The LD light sources 2a to 2d are connected to LD drivers 5a to 5d which are semiconductor light source control means. The LD drivers 5a to 5d are connected to a controller 6. The controller 6 controls the LD drivers 5a to 5d in such a manner that the LD light sources 2a to 2d turn on/off independently or synchronously.

A light incidence end 7a of an optical fiber 7 is disposed on the light path of the light emitted from the coupler 3. The optical fiber 7 transmits the light from the coupler 3. Here, a polarization maintaining type single-mode fiber is used as the optical fiber 7. As the optical fiber 7, different fibers such as multimode fibers may be used in accordance with an optical system of a microscope main body 8 described later.

A light emission end 7b of the optical fiber 7 is connected to the microscope main body 8 configuring the confocal laser scanning microscope. In the microscope main body 8, a dichroic mirror 9 is disposed in the light path of the light emitted from the light emission end 7b of the optical fiber 7. The dichroic mirror 9 has such a characteristic that a wavelength light of a band necessary for exciting a fluorescent specimen S described later is reflected and fluorescence emitted from the fluorescent specimen S is transmitted.

An optical laser scanning system 10 which is scanning means is disposed on a reflected light path of the dichroic mirror 9. The optical laser scanning system 10 has two mirrors (not shown) for deflecting the light in two directions crossing each other at right angles. It becomes possible to form the image and irradiate the laser on the desired position by scanning the laser light in a two-dimensional direction by these mirrors.

An objective lens 11 is disposed on the light path of the laser light two-dimensionally scanned by the optical laser scanning system 10. The objective lens 11 is disposed above a stage 12 and in the vicinity of the fluorescent specimen S dyed by a fluorescent reagent, and is selectively positioned on the light path by an operation of a revolving nosepiece (not shown).

Accordingly, the laser light two-dimensionally scanned by the optical laser scanning system 10 is formed into an image in a focal position of the fluorescent specimen S via the objective lens 11. The fluorescence emitted from the fluorescent specimen S traces a light path in reverse to the laser light, and returns to the dichroic mirror 9 via the objective lens 11 and the optical laser scanning system 10.

A confocal detector 13 which is a confocal detection means is disposed on the light path of the fluorescence passed through the dichroic mirror 9. The confocal detector 13 has a barrier filter 14, a confocal lens 15, a confocal pinhole 16, and a photodetector 17. The barrier filter 14 cuts excitation light, and extracts only fluorescent components to be detected. The confocal pinhole 16 is disposed in a position optically conjugated with a focus of the objective lens 11, transmits focused components in the fluorescence from the fluorescent specimen S, intercepts non-focused components, and imparts a high space resolution. The photodetector 17 receives focused fluorescent components transmitted through the confocal pinhole 16, and converts the components into electric signals by photoelectric conversion. For example, a photo-multiplier is used as the photodetector 17.

A function of the first embodiment configured as described above will be described.

Figure 2:
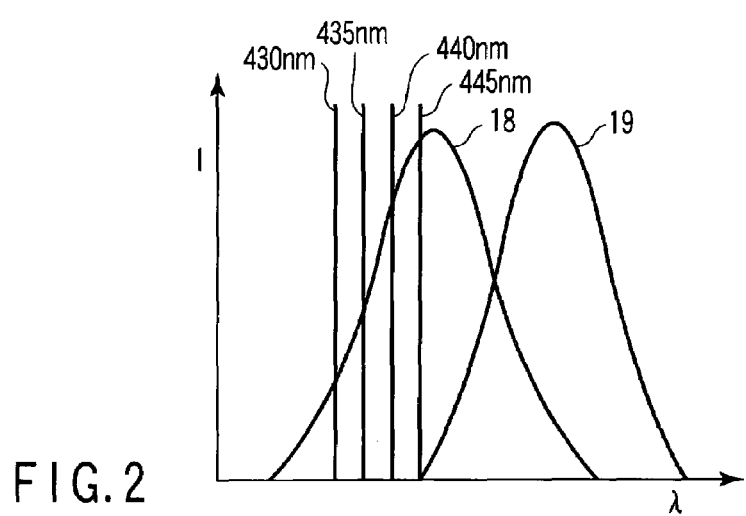
FIG. 2 is a diagram showing a spectral characteristic of a fluorescent reagent for use in the first embodiment.

FIG. 2 is a diagram showing a spectral characteristic of a fluorescent reagent for use in dyeing the fluorescent specimen S. FIG. 2 shows an excitation profile 18 and a fluorescent profile 19. As to the LD light sources 2a to 2d for use in the laser light source 1, it is assumed that a wavelength region of the emitted laser light (430 nm, 435 nm, 440 nm, 445 nm) covers the region of the excitation profile 18 shown in FIG. 2.

The controller 6 issues instructions to the LD drivers 5a to 5d to turn on/off the LD light sources 2a to 2d in order.

When the LD light source 2a is turned on, the laser light having a wavelength region of 430 nm from the LD light source 2a strikes on the dichroic mirror 9 from the coupler 3 via the optical fiber 7, and the light is reflected by the dichroic mirror 9 to thereby enter the optical laser scanning system 10. The laser light two-dimensionally scanned by the optical laser scanning system 10 is formed into an image as the excitation light in the focal position of the fluorescent specimen S via the objective lens 11. The fluorescent specimen S emits the fluorescence in a region of the fluorescent profile 19 (see FIG. 2) by the laser light which has struck. This fluorescence returns to the dichroic mirror 9 via the objective lens 11 and the optical laser scanning system 10. The fluorescence having a long wavelength is passed through the dichroic mirror 9, and converged to the confocal pinhole 16 via the barrier filter 14 and confocal lens 15 of the confocal detector 13.

The confocal pinhole 16 is optically conjugated with the focus of the objective lens 11. Accordingly, the only focused components of the fluorescence from the fluorescent specimen S passes through the confocal pinhole 16, and is received by the photodetector 17. The light is photoelectrically converted, and output as an electric signal.

Also as to the laser light from the LD light sources 2b, 2c, 2d subsequently turned on/off in order, in the same manner as in the laser light from the LD light source 2a, the fluorescence of the region of the fluorescent profile 19 (see FIG. 2) excited by the laser light in the respective wavelength regions of 435 nm, 440 nm, 445 nm passes through the confocal pinhole 16. The light is received by the photodetector 17, photoelectrically converted, and output as the electric signal.

As described above, the monochromatic laser light whose wavelength differs by a 5 nm step is emitted from the LD light sources 2a to 2d in order, and irradiated as the excitation light to the fluorescent specimen S. Each fluorescence is detected by the confocal detector 13. Accordingly, spectroscopy detection can be performed with an excitation wavelength resolution of 5 nm. The fluorescent reagent for use in the fluorescent specimen S emits the fluorescence of the region of the fluorescent profile 19 by the excitation light of the region of the excitation profile 18. Therefore, the laser light whose wavelength regions are 430 nm, 435 nm, 440 nm, 445 nm to cover the region of the excitation profile 18 is switched and supplied as the excitation light in order. Accordingly, a fluorescent spectral result equivalent to that in a conventional case where the fluorescence emitted from the fluorescent specimen is dispersed into fluorescent spectra and detected is obtained from the fluorescence of the region of the fluorescent profile 19.

Accordingly, conventional special configurations such as a diffraction grating and a multi-channel detection unit for spectroscopy detection do not have to be used, and the confocal detector 13 for use in the confocal laser scanning microscope is usable as such. Instead of dispersing the fluorescence into spectra to detect them as in the conventional technique, the light can be detected using the filter 14 (including characteristic which can extract the fluorescence spectrum entirely within the range having no excitation light) optimized with respect to the substantially entire fluorescent spectrum in the confocal detector 13. Therefore, even when the fluorescence emitted from the fluorescent reagent has a small intensity, bright corresponding having a satisfactory SN can be acquired, and satisfactory spectroscopy detection can be performed with a high precision.

The LD light sources 2a to 2d are successively turned on/off in such a manner as to vary the wavelength of the excitation light. However, since the LD light sources 2a to 2d themselves can be controlled in such a manner as to turn on/off at a high speed, the spectroscopy detection having a high excitation wavelength resolution can be performed.

The LD light sources 2a to 2d are formed into the array on the same chip 2e by the semiconductor process, have an integrated configuration, and can therefore be provided with stable operation and performance. Since the LD light sources 2a to 2d are integrally configured, handling is facilitated. Furthermore, since the sources can be easily connected to the optical fiber 7 and the like, costs can be reduced.

Furthermore, since the single-mode fiber is used as the optical fiber 7, the fiber can be handled as an ideal point light source on the microscope main body 8, that is, the confocal laser scanning microscope. Accordingly, compatibility with a commercially available system can be imparted in hardware. Since the LD light sources 2a to 2d have polarization characteristics, the optical fiber 7 is more preferably of a polarization maintaining type. Since polarization directions of the LD light sources 2a to 2d are matched using the polarization maintaining type optical fiber 7, coupling can be performed with higher efficiency.

In the above-described embodiment, an example in which the wavelength region covered by the excitation light source by the LD light sources 2a to 2d is 20 nm at the 5 nm step has been described, but the region is preferably set to 50 nm or less. When a distribution of one composition-component of the LD is changed, variation can be imparted to an oscillation wavelength in a range of 50 nm or less. When the wavelength region is 50 nm or less, the excitation light source itself is not enlarged, and can be easily combined with another excitation light source having a different wavelength region. To cover a largely distant wavelength region, a plurality of light sources in a wavelength region of 50 nm or less may be-prepared.

In the above-described embodiment, a wavelength difference between the LD light sources 2a to 2d is set to 5 nm, but may be set to 1 nm or more in a wavelength region range of 50 nm or less. In this case, the excitation light source capable of switching the wavelength with high precision can be realized. Conversely, when a large wavelength difference is set, an excitation light source capable of switching the wavelength at a large step can be realized. Thus, a broad variation can be given in accordance with purposes.

The LD light sources 2a to 2d have been described as semiconductor laser produced by a semiconductor process, but can be realized by a light emitting diode (LED). When the LED is used, a further inexpensive configuration is possible.

SECOND EMBODIMENT

A second embodiment of the present invention will be described.

Figure 3:
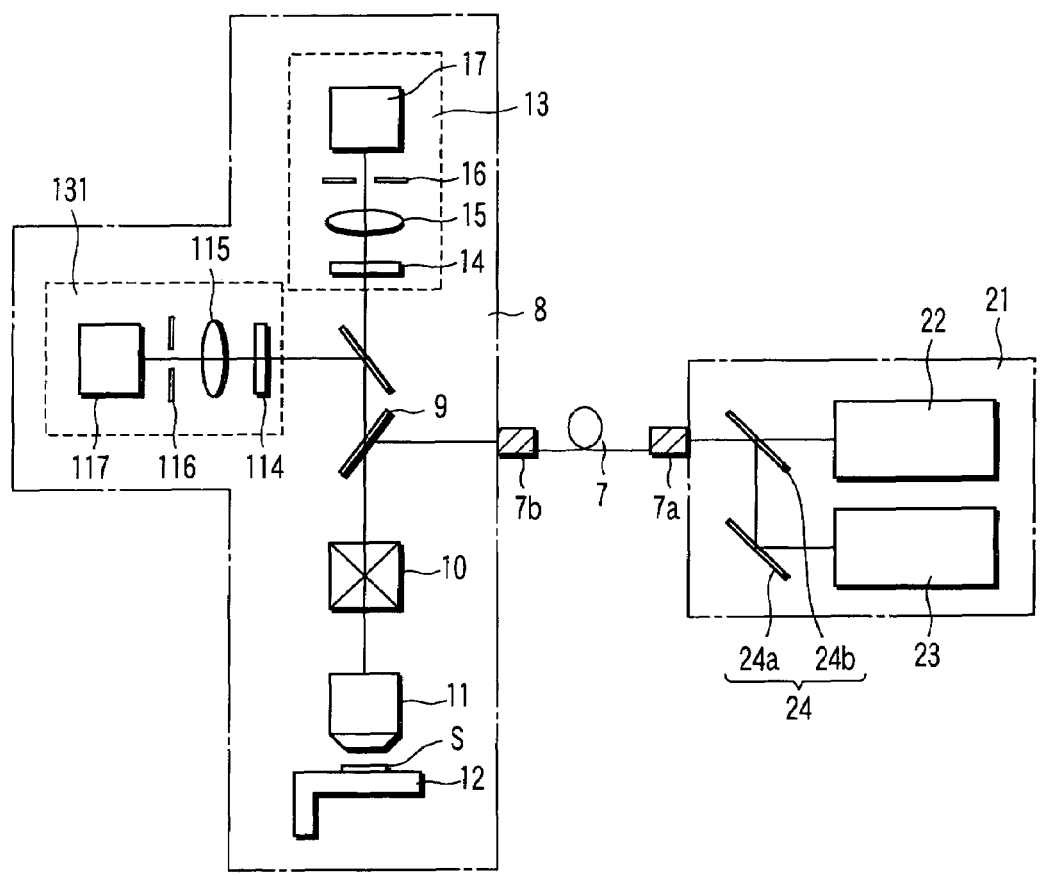
FIG. 3 is a diagram showing a schematic configuration of a second embodiment of the present invention.

FIG. 3 is a diagram showing a schematic configuration of a confocal microspectroscope irradiated to a confocal laser scanning microscope according to the second embodiment of the present invention, and the same components as those of FIG. 1 are denoted with the same reference numerals.

In FIG. 3, a laser light source 21 has a plurality of (two in the figure) excitation light sources 22, 23 which cover different wavelength regions. Each of the excitation light sources 22, 23 has a plurality of LD light sources (not shown) which emit laser light having different wavelengths in the same manner as in the first embodiment. The excitation light sources 22, 23 are also formed into an array on the same chip by a semiconductor process, and a plurality of LD light source compositions slightly differ. Accordingly, monochromatic laser light having different wavelengths are emitted. Here, the excitation light source 22 emits the laser light having different wavelengths of 430 nm, 435 nm, 440 nm, and 445 nm at a 5 nm step. The excitation light source 23 emits the laser light having different wavelengths of 460 nm, 465 nm, 470 nm, and 475 nm at a 5 nm step.

In the same manner as in the first embodiment, the excitation light sources 22, 23 are provided with: a coupler for combining laser light emitted from the respective LD light sources to output one beam; LD drivers for controlling the respective LD light sources in such a manner as to individually turn on/off the sources; and a control unit which controls these LD drivers in such a manner as to turn on/off the LD light sources independently or synchronously.

A laser light synthesizer 24 for synthesizing the laser light from the excitation light sources 22, 23 is disposed on a light path of the laser light from the excitation light sources 22, 23. The laser light synthesizer 24 comprises a mirror 24a which reflects the laser light from the excitation light source 23, and a dichroic mirror 24b which reflects the laser light reflected by the mirror 24a and which transmits the laser light from the excitation light source 22.

The laser light synthesizer 24 is connected to a microscope main body 8 via an optical fiber 7. The optical fiber 7 and microscope main body 8 are similar to those of the first embodiment. It is to be noted that in the microscope main body 8, two confocal detectors 13, 131 are disposed to detect different fluorescence of fluorescent reagents in accordance with the excitation light sources 22, 23. The confocal detector 131 has a configuration similar to that of the confocal detector 13.

Next, a function of the second embodiment will be described.

Figure 4:
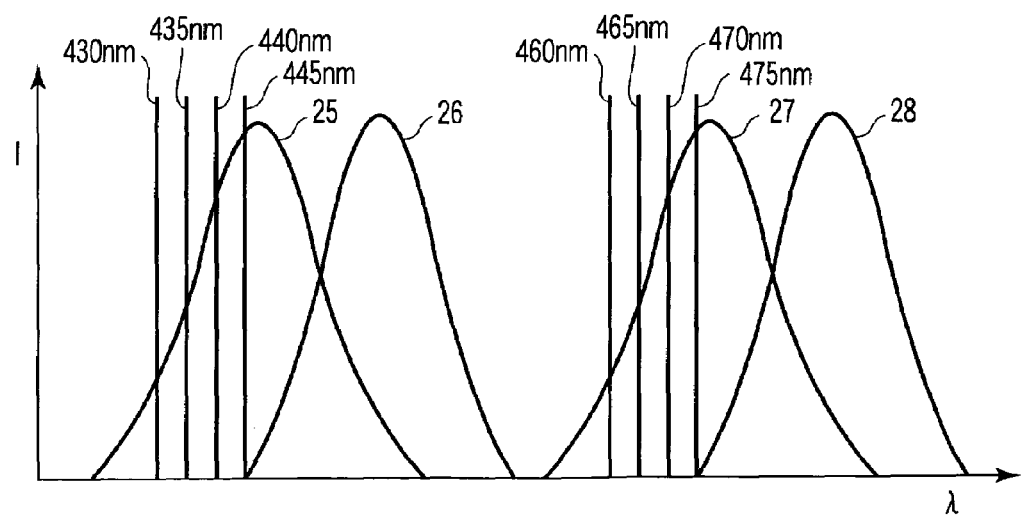
FIG. 4 is a diagram showing the spectral characteristic of the fluorescent reagent for use in the second embodiment.

FIG. 4 is a diagram showing spectral characteristics of the fluorescent reagents in a case where a fluorescent specimen S is dyed with two fluorescent reagents. One fluorescent reagent comprises an excitation profile 25 and a fluorescent profile 26. The other fluorescent reagent comprises an excitation profile 27 and a fluorescent profile 28. It is assumed that in one excitation light source 22 for use in the laser light source 21, wavelength regions (430 nm, 435 nm, 440 nm, 445 nm) of the emitted laser light cover a region of the excitation profile 25 shown in FIG. 4. It is assumed that in the other excitation light source 23, wavelength regions (460 nm, 465 nm, 470 nm, 475 nm) of the emitted laser light cover a region of the excitation profile 27 shown in FIG. 4.

When the respective LD light sources of the excitation light sources 22, 23 are turned on/off in order, two fluorescent reagents emit the fluorescence of the regions of the fluorescent profiles 26, 28 (see FIG. 4) by excitation by the laser light from the LD light sources. Each fluorescence is detected by each of the confocal detectors 13, 131 for each wavelength.

Therefore, even when the fluorescent specimen S is dyed with two fluorescent reagents, the laser light having different wavelengths of 430 nm, 435 nm, 440 nm, and 445 nm is successively emitted from the excitation light source 22 at the 5 nm step, and the laser light having different wavelengths of 460 nm, 465 nm, 470 nm, 475 nm is successively emitted from the excitation light source 23 at the 5 nm step. Accordingly, excitation light illumination capable of switching multiple wavelengths synchronously for two colors to cover two excitation light wavelength regions can be realized, and spectroscopy detection can be performed with an excitation wavelength resolution of 5 nm.

Also in the second embodiment, in the same manner as in the first embodiment, brighter fluorescence can be acquired with good SN, and spectroscopy detection can be performed with high precision. The fluorescence is detected in the above-mentioned embodiment, but the scattered light (Raman light and phosphorescence, etc.) may be detected.

According to the embodiments of the present invention, monochromatic light is emitted in order from a plurality of semiconductor light sources whose wavelengths are slightly different from one another, the light is irradiated as the excitation light to the specimen by scanning means, and the fluorescence emitted from the specimen is detected by confocal detection means. Accordingly, the spectroscopy detection can be performed with a excitation wavelength resolution in accordance with the excitation wavelength. Therefore, bright fluorescence having good SN can be acquired, and satisfactory spectroscopy detection with high precision can be realized.

According to the embodiments of the present invention, a plurality of semiconductor light sources are formed on the same chip by the semiconductor process, and integrally configured. Accordingly, stable operation and performance can be provided. Since the semiconductor light source is integrally configured, handling is simplified, and costs can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A confocal microspectroscope comprising:
    an excitation light source comprising at least two semiconductor monochromatic light sources with slightly different wavelengths formed on a same chip;
    a controller which sequentially irradiates monochromatic light from the semiconductor monochromatic light sources to a specimen one by one;
    a scanner which scans each irradiated monochromatic light on the specimen;
    a detector which detects a fluorescence emitted by the specimen in response to the irradiation of the monochromatic light; and
    an optical system which leads substantially an entire spectrum of the fluorescence emitted by the specimen to the detector;
    wherein an excitation profile of the fluorescence is acquired by measuring a strength of the fluorescence emitted by the specimen in response to each irradiated monochromatic light;
    wherein the specimen is dyed with at least one fluorescent dye; and
    wherein at least two wavelengths of the irradiated monochromatic light are within an excitation wavelength range of one said fluorescent dye.

2. The confocal microspectroscope according to claim 1, wherein:
    the excitation light source further comprises a coupler which couples the monochromatic light emitted from the semiconductor monochromatic light sources,
    the semiconductor monochromatic light sources are arranged in an array, and
    the semiconductor monochromatic light sources and the coupler are arranged on a same substrate.

3. The confocal microspectroscope according to claim 1, wherein the excitation light source has a wavelength region of 50 nm or less.

4. The confocal microspectroscope according to claim 1, wherein a wavelength difference between the at least two semiconductor monochromatic light source is at least 1 nm and a wavelength region covered by the semiconductor monochromatic light sources is 50 nm or less.

5. The confocal microspectroscope according to claim 4, wherein the wavelength difference between each of the semiconductor monochromatic light source is 5 nm and the wavelength region covered by the semiconductor monochromatic light source is 50 nm.

6. The confocal microspectroscope according to claim 1, wherein the semiconductor monochromatic light sources each comprise one of a semiconductor laser and a light emitting diode.

7. The confocal microspectroscope according to claim 1, further comprising:
    an optical fiber which transmits the monochromatic light from the excitation light source to the microscope main body, wherein the optical fiber is a single-mode fiber.

8. The confocal microspectroscope according to claim 7, wherein the optical fiber is a polarization maintaining type fiber.

9. A confocal microspectroscope comprising:
    a first excitation light source comprising at least two semiconductor monochromatic light sources with slightly different wavelengths formed on a same first chip, and which covers a first wavelength region;
    a second excitation light source comprising at least two semiconductor monochromatic light sources with slightly different wavelengths formed on a same second chip, and which covers a second wavelength region different from the first wavelength region;
    a controller which simultaneously: (i) sequentially irradiates monochromatic light from the semiconductor monochromatic light sources of the first excitation light source to the specimen one by one, and (ii) sequentially irradiates monochromatic light from the semiconductor monochromatic light sources of the second excitation light source to the specimen one by one;
    a scanner which scans each irradiated monochromatic light on the specimen;
    a first detector which detects a first fluorescence emitted by the specimen in response to the irradiation of the monochromatic light from first excitation light source;
    a second detector which detects a second fluorescence emitted by the specimen in response to the irradiation of the monochromatic light from the second excitation light source; and
    an optical system which leads substantially an entire spectrum of the first fluorescence and the second fluorescence emitted by the specimen to the first and second detectors, respectively;
    wherein an excitation profile of the first fluorescence and the second fluorescence are acquired by measuring a strength of the first fluorescence and the second fluorescence emitted by the specimen in response to each irradiated monochromatic light;
    wherein the specimen is dyed with at least first and second fluorescent dyes;
    wherein at least two wavelengths of the monochromatic light irradiated from the first excitation light source are different from each other and are included in an excitation wavelength range of the first fluorescent dye; and
    wherein at least two wavelengths of the monochromatic light irradiated from the second excitation light source are different from each other and are included in an excitation wavelength range of the second fluorescent dye.

10. The confocal microspectroscope according to claim 9, wherein at least one of the first and second excitation light sources has a wavelength region or 50 nm or less.

11. The confocal microspectroscope according to claim 10, wherein a wavelength difference between the at least two semiconductor monochromatic light sources of at least one of the first and second excitation light sources is at least 1 nm and a wavelength region covered by said at least two semiconductor monochromatic light sources is 50 nm or less.

12. The confocal microspectroscope according to claim 11, wherein the wavelength difference between each of the semiconductor monochromatic light sources of said at least one of the first and second excitation light sources is 5 nm and the wavelength region covered by said semiconductor monochromatic light sources is 50 nm.

13. The confocal microspectroscope according to claim 9, wherein:

the first and second excitation light sources each further comprise a coupler which couples the monochromatic light emitted from the semiconductor monochromatic light sources, the semiconductor monochromatic light source of each of the first and second excitation light source are arranged in an array, and the semiconductor monochromatic light sources and the coupler of each of the first and second excitation light sources are arranged on a same substrate.

14. The confocal microspectroscope according to claim 9, wherein the semiconductor monochromatic light sources each comprise one of a semiconductor laser and light-emitting diode.

15. The confocal microspectroscope according to claim 9, further comprising:

an optical fiber which transmits the monochromatic light from the first and second excitation light sources to the microscope main body, wherein the optical fiber is a single-mode fiber.

16. A confocal microspectroscope comprising:

an excitation light source comprising at least two semiconductor monochromatic light sources with slightly different wavelengths formed on a same chip;

a controller which sequentially irradiates monochromatic light from the semiconductor monochromatic light sources to a specimen one by one;

a scanner which scans each irradiated monochromatic light on the specimen;

a detector which detects a fluorescence emitted by the specimen in response to the irradiation of the monochromatic light; and an optical system which leads substantially an entire spectrum of the fluorescence emitted by the specimen to the detector;

wherein a strength of the fluorescence emitted by the specimen in response to each irradiated monochromatic light is measured;

wherein the specimen is dyed with at least one fluorescent dye; and wherein at least two wavelengths of the irradiated monochromatic light are within an excitation wavelength range of one said fluorescent dye.

* * * * *